United States Patent
Naft et al.

[11] Patent Number: 5,862,571
[45] Date of Patent: Jan. 26, 1999

[54] COMFORT GRIP HANDLE AND PROCESS

[75] Inventors: Stuart Naft, Fairfield; George M. Drizos, Cheshire; Edward M. Kubicz, Torrington; Lee H. Eckert, Cheshire; Michael J. Marchetti, Bridgeport; Roger Lockshier, Monroe; Scott Rosander, West Haven; Carmine Mancini, Oakville, all of Conn.

[73] Assignee: HP Intellectual Corp., Miami Lakes, Fla.

[21] Appl. No.: 781,394

[22] Filed: Jan. 10, 1997

[51] Int. Cl.⁶ ..................................................... A47B 95/02
[52] U.S. Cl. ................... 16/111 R; 16/110 R; 16/116 R; 16/DIG. 18; 16/DIG. 19; 16/DIG. 12
[58] Field of Search .............................. 16/110 R, 111 R, 16/116 R, DIG. 18, DIG. 19, DIG. 12; 38/90–92, 95; 81/177.1, 489, 900, 427.5; 30/526, 340–343

[56] References Cited

U.S. PATENT DOCUMENTS

| | | | |
|---|---|---|---|
| Re. 20,165 | 11/1936 | Knapp | 38/95 |
| Re. 34,194 | 3/1993 | Stowell et al. | 16/111 R |
| D. 294,991 | 3/1988 | Johnson et al. | D32/70 |
| 1,455,502 | 5/1923 | Mertz . | |
| 1,908,834 | 5/1933 | Engberg et al. . | |
| 1,940,755 | 12/1933 | Knapp | 68/26 |
| 1,958,668 | 5/1934 | Lark | 68/26 |
| 2,121,989 | 6/1938 | Schnase et al. | 16/DIG. 12 |
| 2,140,157 | 12/1938 | Huffman | 38/90 |
| 2,144,474 | 1/1939 | Woodman | 38/90 |
| 2,290,336 | 7/1942 | Kirby | 15/143 |
| 2,324,226 | 7/1943 | Murphy | 38/95 |
| 2,466,719 | 4/1949 | MacKearnin | 38/95 |
| 2,639,521 | 5/1953 | Rickettson | 38/90 |
| 3,122,774 | 3/1964 | Lam | 16/110 |
| 3,321,798 | 5/1967 | Plamondon | 16/111 R |
| 3,813,729 | 6/1974 | Szabo et al. | 16/110 R |
| 4,782,609 | 11/1988 | Cartabbia | 38/90 |
| 4,837,892 | 6/1989 | Lo | 16/116 R |
| 4,964,192 | 10/1990 | Marui | 16/111 R |
| 5,042,804 | 8/1991 | Uke et al. | 81/177.1 |
| 5,097,566 | 3/1992 | Decker | 16/111 R |
| 5,134,008 | 7/1992 | Alm | 428/90 |
| 5,261,665 | 11/1993 | Downey | 16/116 R |
| 5,290,063 | 3/1994 | Lenhart | 16/DIG. 12 |

FOREIGN PATENT DOCUMENTS

| | | |
|---|---|---|
| 87402396.3 | 10/1987 | European Pat. Off. . |
| 0 240 471 | 10/1990 | European Pat. Off. . |
| 0556 721 | 2/1993 | European Pat. Off. . |
| 95 104 622.6 | 3/1995 | European Pat. Off. . |
| PCT EP 95 01177 | 3/1995 | European Pat. Off. . |
| PCT EP 96/00746 | 3/1995 | European Pat. Off. . |
| 95 107 473.1 | 5/1995 | European Pat. Off. . |
| 95 116 706.3 | 10/1995 | European Pat. Off. . |
| 1 939 634 | 6/1966 | Germany . |
| 28 10 418 | 3/1978 | Germany . |
| 78 15 717 | 5/1978 | Germany . |
| 36 03 409 | 2/1986 | Germany . |
| 3622596 | 7/1986 | Germany . |
| 44 22 089.8 | 6/1994 | Germany . |
| 295 05 735 | 4/1995 | Germany . |
| 195 39 200.0 | 10/1995 | Germany . |
| 2274515 | 8/1994 | United Kingdom ................. 16/110 R |

*Primary Examiner*—Chuck Y. Mah
*Attorney, Agent, or Firm*—Barry E. Deutsch

[57] ABSTRACT

An improved process for producing integral, composite handles having cushioned comfort grips, for appliances such as electric steam irons, comprising a first step of injection molding a one-piece handle substrate of strong, rigid, resinous composition having the desired predetermined shape and design, including a recessed, wrap-around area corresponding to the area of the handle which will be gripped by the hand of the eventual user of appliance. The present process comprises a second step of injection molding an integral, outer, soft, contoured layer of foamed resin into the recessed, wrap-around area of the rigid plastic handle substrate, to form a smooth, compressible, comfort grip surface area of the composite handle for engagement with the hand of the user.

5 Claims, 1 Drawing Sheet

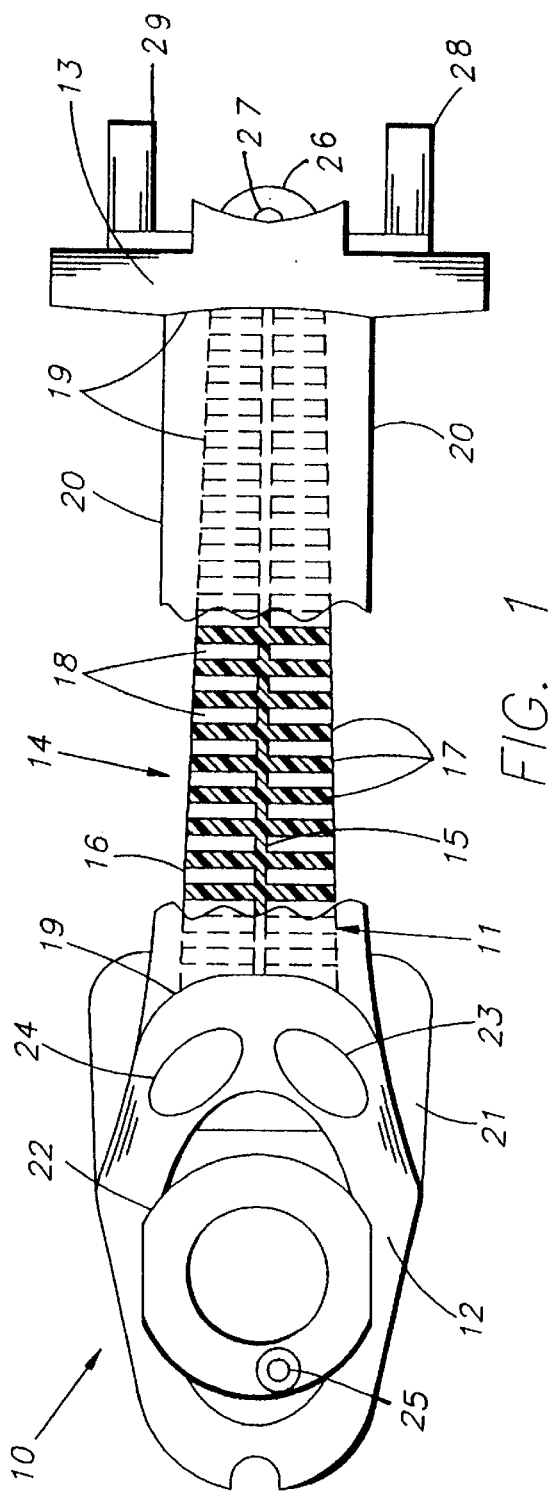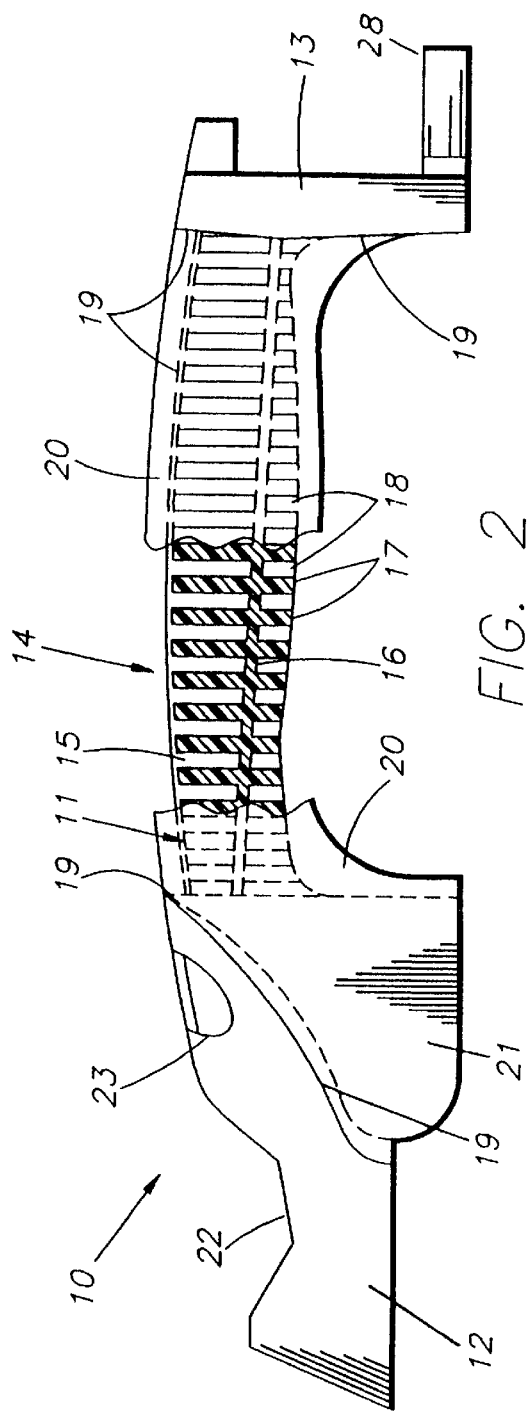

COMFORT GRIP HANDLE AND PROCESS

BACKGROUND OF THE INVENTION

1. Field of the Invention

The present invention relates to improving the comfort and feel of handles of devices such as appliances, most particularly electric steam irons and similar devices which are gripped and guided by the hand of the user, sometimes for prolonged periods of time.

2. Description of the State of the Art

It is known to provide the handles of appliances, such as electric irons, with covers of foam rubber or sponge rubber to cushion the grip and/or for other purposes, and reference is made to U.S. Pat. Nos. 2,324,226 (Murphy) and 2,639,521 (Rickettson).

The Murphy U.S. Pat. No. 2,324,226 relates to sponge-like rubber covers, such as sleeves, which are forced over the handle of a flatiron as a cushion grip. Such covers are unsatisfactory because they must be produced, separately from the iron, must be applied to the handle of the iron, and can become separated, damaged or lost.

Rickettson U.S. Pat. No. 2,639,521 discloses a sponge rubber or foam rubber pad which is formed separately from the handle of an iron, and then adhered to the handle, such as by rubber cement, to facilitate use of the iron. As with the Murphy Patent, the foam pads of Rickettson must be produced, separate from the iron, and then must be adhered to the handle in a predetermined manner.

U.S. Pat. No. 4,837,892 (Lo) discloses cushioned handle for appliances such as electric hair curling irons, comprising rigid molded plastic handle halves over which rubber or elastomer overlay surface portions are molded to form composite molded handle halves which are then applied to the appliance and connected to each other by means of penetrating forward and rear screw joiners. The rubber overlay portions are secured to the rigid plastic handle halves by penetration of the rubber into openings or holes in the handle halves during the step or molding the overlay portions over the handle halves. However, this process has serious disadvantages in that the handle halves must be individually molded, then the composite rubber overlay/handle halves must be individually molded, and then the composite handle halves must be applied to the appliance and united by penetrating screw joiners.

SUMMARY OF THE INVENTION

The present invention relates to an improved process for producing integral, composite handles having cushioned comfort grips, for appliances, such as electric steam irons, comprising a first step of providing, such as by injection molding, a one-piece handle substrate of strong, rigid, plastic composition having the desired predetermined shape and design, including a recessed, wrap-around area corresponding to the area of the handle which will be gripped by the hand of the eventual user of the appliance. The present process comprises a second step of injection molding, such as by double shot or overmolding, an integral, outer, soft, contoured layer of foamed resin into the recessed, wrap-around area of the rigid plastic handle substrate, to form a smooth, compressible, comfort grip surface area of the composite handle for engagement with the hand of the user.

The composite handle is completely formed by the present two-step process, ready for attachment to the predetermined appliance in conventional manner.

THE DRAWING

In the accompanying drawings:

FIG. 1 is a top view, in partial section, illustrating a handle for a steam iron, with portions of the rigid plastic handle substrate in the recessed wrap-around gripping areas being shown in broken lines where overlaid by the foam resin cushion grip, and with other portions of the rigid plastic handle substrate being exposed by removal of the foam resin cushion grip, and FIG. 2 is a side view of the composite iron handle of FIG. 1.

DETAILED DESCRIPTION

FIG. 1 illustrates a composite handle 10 designed for attachment to the housing of a conventional electric steam iron. The handle 10 has a molded rigid plastic substrate 11 having generally-exposed front and rear surface portions 12 and 13, respectively, connected by a generally-recessed skeletal structure 14. In the embodiment illustrated, the front surface portion 12 of the steam iron handle 10 is molded with a recess 22 adapted to receive a temperature control wheel and containing a hole 25 adapted to receive a screw for attaching the handle to the housing of the iron. Also, portion 12 is molded with openings 23 and 24 to accommodate activation buttons for a steam surge and for a water spray, respectively. The connecting structure 14 has a +-shaped horizontal backbone comprising a continuous vertically-wide rib 15 and a continuous horizontally-wide rib 16 and a plurality of closely-spaced fin members 17 integrally molded with the ribs 15 and 16 to provide a handle substrate 14 which is relatively light in weight, due to the plurality of air spaces or slots 18 between the fins 17, and yet has excellent strength in all directions.

The rear surface portion 13 of the rigid substrate 11, in the illustrated embodiment, is molded with a lower central extension flange 26 provided with a hole 27 for receiving an attachment screw to secure the handle to the housing of the iron, and with an opposed pair of internally-threaded bosses 28 and 29 to receive rear cover attachment screws.

The composite handle 10 of FIGS. 1 and 2 also comprise a molded foam resin outer layer 20 which is injection molded over the rigid plastic substrate 11 into the recessed, wrap-around areas 19 thereof, corresponding to the area of the handle which is to be gripped by the user, including the thumb rest areas 21. This is accomplished by using the rigid plastic substrate 11 as a mold core, supported within mold halves which provide a wrap around injection cavity corresponding to the recessed areas of the substrate which are to be filled with the foam resin layer 20. The injection cavity is then filled at low pressure with a flowable foam-forming resinous composition which contains or generates a blowing agent, such as carbon dioxide gas, and cures to form the compressible, wrap-around, smooth surface foam resin outer layer 20, including the thumb grip areas 21. The composite handle 10 is substantially ready for attachment to the electric steam iron upon removal from the mold upon full cure. The smooth outer surface of the foam resin layer 20 has a molded curvature which conforms to the grip of the user and which tapers or transitions to the outer surfaces of the front and rear areas 12 and 13 of the rigid support substrate 11 with which foam layer 20 interfaces for a smooth feel and appearance.

The rigid plastic substrate 11 illustrated by the drawings is a preferred substrate in that it permits the foam layer to expand partially into the plurality of wrap-around slots 18 of the substrate 11 during the foam-forming expansion and formation of the foam layer 20, to produce wrap-around integration and bonding. Moreover, the compressibility and feel of the foam layer 20 to the grip of the user is uniform since the soft foam layer can be compressed into the wrap-around slots to provide uniform temporary "give" in all radial directions, the foam layer 20 returning to its molded shape when hand pressure is relaxed.

The present comfort grip handle 10 may be made from two different thermoplastic resins, in a two step standard injection molding process.

The first step of the manufacturing process is to injection-mold the rigid substrate 11 from a high impact strength resin such as a polycarbonate resin, processed at the recommended molding conditions. After the substrate 11 is molded, it is allowed to cure to room temperature to obtain all the mechanical properties of the molded polycarbonate resin.

The second step of the process involves injection-molding the overmold foam layer 20 over and around the polycarbonate substrate 11 by first inserting and supporting the substrate 11 centered within the injection mold. A preferred overmold material (a melt processible rubber) is a halogenated ethylene interpolymer elastomer with a Durometer of 60 Shore A. The halogenated ethylene interpolymer elastomer is mixed with an endothermic chemical foaming agent composition before being fed into the screw of the injection molding machine. A preferred foaming composition consists of a blend of sodium salts of carbonic and polycarboxylic acids together with a styrene-ethylene/butylene-styrene block copolymer, polyalphamethylstyrene blend commerically-available under the trademark Safoam FP-40. The foaming agent produces a smooth solid skin around a fine cellular core layer within the halogenated ethylene interpolymer elastomer. This creates the desired cushion feel in the comfort handle.

A chemical and physical or mechanical bond is formed between the halogenated ethylene interpolymer blend and the polycarbonate substrate during the injection cycle because the resins are compatible and similar in chemical nature.

As the halogenated ethylene polymer blend enters the mold and contacts the polycarbonate substrate, it momentarily melts the surface skin of the polycarbonate and forms a chemical bond.

The foaming agent begins to activate and decompose over the temperature range 330° F. to 400° F. The melt processible foam-forming layer 20 is injection molded at 350° F. The foaming agent begins activation in the screw of the injection molding machine. It continues decomposition throughout the remainder of the injection molding cycle and reaches completion before the molding cycle is completed. For the foaming agent to work properly, only about 90% of the injection mold cavity is filled with the foam-forming composite. The foaming agent expands and creates a fine cellular structure of the halogenated ethylene interpolymer blend to fill the remainder of the mold cavity. The overmold material does not completely fill the inside of the substrate because the foaming agent does not create enough pressure to force the halogenated ethylene polymer down to fill the slots 18 between the ribs 17 in the substrate 11. Once the molding cycle is completed, the finished handle is removed from the mold and allowed to fully cure.

The rigid plastic substrate 11 of the drawings may be provided with slotted, undercut, dovetailed or other integration areas at the recess interfaces between the foam layer 20 and the exposed front and rear surface areas 12 and 13, respectively, of the rigid substrate and/or beneath and adjacent the thumb rest areas 21. Such integration areas provide an additional peripheral manual interlock between the foam layer 20 and the substrate 11 to preclude any relative movement therebetween over the lifespan of the appliance.

The rigid plastic substrate may have a structure different from that illustrated by the present drawings. For example, the recessed area of the rigid substrate may be a hollow tubular section, preferably provided with spaced surface holes or openings to admit some of the foam-forming composition and provide anchoring points for the formed foam layer.

It will be apparent to those skilled in the art that the present handle substrates 11 preferably are injection molded from high impact strength, thermally-stable resinous molding compositions conventionally used for this purpose. Preferred thermoplastic resins are polycarbonates, including blends and acrylonitrile-butadiene-styrene (ABS) polymers.

It will also be apparent to those skilled in the art that a variety of low durometer foam-forming thermoplastic resinous compositions are suitable for use as injection molding compositions to form the present compressible foam layer 20. Preferably the foamable resin is one which is chemically-compatible with the resin of the substrate, and the foam-forming reaction is endothermic to avoid excessive heating and softening of the substrate 11.

A preferred foam-forming composition is a halogenated ethylene interpolymer elastomer composition incorporating a Safoam FP-40 polymer blend-carboxylic acid salt blowing agent composition which generates carbon dioxide during its slow, low pressure expansion step. A preferred halogenated ethylene interpolymer elastomer composition is commercially-available from duPont under the trademark "Alcryn".

Other conventional foam-forming compositions which produce an integral skin, a cellular core and a high strength-to-weight ratio are also suitable. Such compositions are commonly based upon thermoplastic elastomeric polymers such as vinyl polymers, polyurethane resins and olefinic polymers and copolymers.

While the present specification refers to the outer surface of the foam layer 20 as being integral and smooth, this means that the layer 20 has a continuous outer skin, devoid of open cells, and formed before expansion is completed. If desired, the outer surface of such skin may be molded to have a textured or patterned feel and appearance, imparted by the surface of the mold.

It should be understood that the foregoing description is only illustrative of the invention. Various alternatives and modifications can be devised by those skilled in the art without departing from the spirit of the invention. Accordingly, the present invention is intended to embrace all such alternatives, modifications and variances which fall within the scope of the appended claims.

What is claimed is:

1. A composite handle for an appliance, which is strong, light in weight, and comfortable to the hand of the user, comprising a rigid, elongated handle substrate molded of resinous composition, and having first and second end portions and an intermediate portion, said first and second end portions each comprising an exposed surface area at each end and said intermediate portion forming a gripping area, and having molded into said gripping area a continuous wrap-around layer of compressible resinous foam which is bonded to the intermediate portion of the substrate to provide a comfort grip for an appliance, the gripping area of the rigid substrate comprises a first vertically wide rib, a second horizontally wide rib, and a plurality of horizontally spaced vertical fin members integrally molded with the first and second ribs to form a shaped backbone, said layer of resinous foam being expanded to some extent into the spaces between said vertical fin members to bond the foam layer to the intermediate portion of the substrate.

2. A composite handle according to claim 1 in which the substrate is molded of a high impact strength, thermally stable resinous composition.

3. A composite handle according to claim 2 in which the rigid substrate comprises a polycarbonate resin.

4. A composite handle according to claim 2 in which the rigid substrate comprises an acrylonitrile-butadiene-styrene.

5. A composite handle according to claim 1 in which the resinous foam comprises a synthetic thermoplastic elastomer.

* * * * *